Patented Oct. 19, 1926.

1,603,291

UNITED STATES PATENT OFFICE.

DAVID PEPPER, OF PHILADELPHIA, PENNSYLVANIA.

BATTERY ELECTRODE.

No Drawing.   Application filed July 30, 1924.   Serial No. 729,047.

My invention relates to the manufacture of battery electrodes and has for its object to provide a method of forming an electrode from pre-formed active lead material and in which the active material will be of desirable consistency with regard to hardness and porosity; will have a high degree of electric conductivity; will be free from a tendency to disintegration and will retain these qualities on repeated charge and discharge. My invention is based on my discovery that in the formation of a paste by mixing pre-formed lead material, that is, either lead peroxide or spongy lead in the form of fine powder with sulphuric acid, the presence in the acid of a small percentage of zinc sulphate, will result in the formation of an electrode, when the paste is applied and dried to the proper support, which will have the desirable qualities I have noted to a marked degree. My invention accordingly consists in the method of manufacturing electrodes by making a paste of pre-formed lead material by mixing it with a solution of sulphuric acid having zinc sulphate dissolved in it.

The strength of the acid used should be about 1.10 specific gravity and I have found that marked beneficial results are secured by mixing with the acid a solution of zinc sulphate in quantity between one tenth of one percent and three percent of the lead material. I believe the best results are secured by the use of about two tenths of one percent of the zinc sulphate.

I find it desirable, particularly where the active preformed material is spongy lead, to form the paste in a chamber from which air is excluded.

In practice, in the formation of a paste of the proper consistency, I apply it to the grid or other support with pressure so as to secure proper adherence and, after treating, the electrodes are in condition for use without further treatment and will be found to be of very good admixture and free from a tendency to disintegrate in use.

The chemical reactions which occur in my paste, I am unable to explain in any detail. There is no doubt that the addition of the zinc sulphate leads to the formation of lead sulphate which is so distributed through the active material as to act as a binder and my improvements convince me that the distribution of this material throughout the active material is peculiarly well adapted to bring about a permanence and other good qualities in the plate.

Having now described my invention, what I claim as new and desire to secure by Letters Patent, is:—

1. In the manufacture of battery electrodes the method which consists in making a paste of preformed lead material by mixing with it a solution of sulphuric acid having zinc sulphate dissolved in it, applying the so formed paste to a conducting support by pressure and drying the applied paste.

2. In the manufacture of battery electrodes the method which consists in making a paste of preformed lead material by mixing with it a solution of sulphuric acid having zinc sulphate dissolved in it in quantity between .1% to 3% of the lead material, applying the so formed paste to a conducting support by pressure and drying the applied paste.

3. In the manufacture of battery electrodes the method which consists in making a paste of preformed lead material by mixing with it with exclusion of air a solution of sulphuric acid having zinc sulphate dissolved in it, applying the so formed paste to a conducting support by pressure and drying the applied paste.

4. In the manufacture of battery electrodes the method which consists in making a paste of peroxide of lead by mixing with it a solution of sulphuric acid having zinc sulphate dissolved in it, applying the so formed paste to a conducting support by pressure and drying the applied paste.

DAVID PEPPER.